(12) United States Patent
Hironaka et al.

(10) Patent No.: US 9,566,830 B2
(45) Date of Patent: Feb. 14, 2017

(54) PNEUMATIC TIRE

(71) Applicant: BRIDGESTONE CORPORATION, Chuo-ku, Tokyo (JP)

(72) Inventors: Takayoshi Hironaka, Kodaira (JP); Yuki Kawakami, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 184 days.

(21) Appl. No.: 14/379,146

(22) PCT Filed: Feb. 22, 2013

(86) PCT No.: PCT/JP2013/001033
§ 371 (c)(1),
(2) Date: Aug. 15, 2014

(87) PCT Pub. No.: WO2013/125246
PCT Pub. Date: Aug. 29, 2013

(65) Prior Publication Data
US 2015/0007918 A1    Jan. 8, 2015

(30) Foreign Application Priority Data

Feb. 24, 2012    (JP) ................. 2012-039215

(51) Int. Cl.
B60C 11/03    (2006.01)
B60C 11/12    (2006.01)
(Continued)

(52) U.S. Cl.
CPC ................ B60C 11/13 (2013.01); B60C 11/01 (2013.01); B60C 11/0311 (2013.04);
(Continued)

(58) Field of Classification Search
CPC .... B60C 11/13; B60C 11/01; B60C 2011/013; B60C 13/02; B60C 11/0311; B60C 11/0316; B60C 11/0313; B60C 2011/1338; B60C 2011/1361; B60C 2200/065; B60C 11/12; B60C 11/1236; B60C 2011/1277; B60C 11/1281
(Continued)

(56) References Cited

U.S. PATENT DOCUMENTS

2009/0159166 A1* 6/2009 Sakamoto ............... B60C 13/02
                                                          152/209.16
2010/0180994 A1* 7/2010 Yamaguchi ............. B60C 11/01
                                                          152/153

(Continued)

FOREIGN PATENT DOCUMENTS

CN    101605666 A    12/2009
EP    2143571 A2     1/2010
(Continued)

OTHER PUBLICATIONS

Communication dated Sep. 22, 2015 from the European Patent Office in counterpart application No. 13752007.8.
(Continued)

Primary Examiner — Eric Hug
(74) Attorney, Agent, or Firm — Sughrue Mion, PLLC

(57) ABSTRACT

A pneumatic tire adapted to effectively suppress temperature rise of a tread portion during loaded rolling of the tire, and sufficiently suppress failure of the tread portion due to the temperature rise. The tread portion of the pneumatic tire extends between both tread ends and has a tread surface with lug grooves. Each lug groove extends in a tire width direction and has an opening at its one end to a buttress that extends from the tread end radially inwards of the tire. The buttress has a surface with a projection on one side, in a tire circumferential direction, of the buttress-side opening of the lug groove to protrude in the tire width direction. The projection has a radially outer end in a radially outer side (Continued)

than a radially inner end of the buttress-side opening of the lug groove.

14 Claims, 10 Drawing Sheets

(51) Int. Cl.
*B60C 11/13* (2006.01)
*B60C 13/02* (2006.01)
*B60C 13/00* (2006.01)
*B60C 11/01* (2006.01)

(52) U.S. Cl.
CPC .......... *B60C 11/0316* (2013.04); *B60C 11/12* (2013.01); *B60C 13/002* (2013.04); *B60C 2011/0344* (2013.04); *B60C 2011/0348* (2013.04); *B60C 2011/0365* (2013.04); *B60C 2200/065* (2013.04)

(58) Field of Classification Search
USPC ..... 152/209.16, 523, 209.12, 209.18, 209.25
See application file for complete search history.

(56) References Cited

U.S. PATENT DOCUMENTS

2013/0220498 A1* 8/2013 Kawakami .............. B60C 11/01
152/209.1

2015/0007918 A1 1/2015 Hironaka et al.

FOREIGN PATENT DOCUMENTS

| EP | 2 818 333 A1 | 12/2014 |
| JP | 57-174203 U | 11/1982 |
| JP | 2000-280711 A | 10/2000 |
| JP | 2004-155335 A | 6/2004 |
| JP | 2009-149181 A | 7/2009 |
| JP | 2011-105171 A | 6/2011 |
| WO | 2008/096879 A1 | 8/2008 |
| WO | 2010/044319 A1 | 4/2010 |
| WO | WO 2012/026595 * | 3/2012 |
| WO | 2013/125246 A1 | 8/2013 |

OTHER PUBLICATIONS

Communication dated Jul. 16, 2015, issued by the Russian Patent Office in counterpart Application No. 2014138627.
International Search Report for PCT/JP2013/001033 dated May 14, 2013 [PCT/ISA/210].
Communication dated Jun. 11, 2015 from the Australian Intellectual Property Office in counterpart application No. 2013223565.
Communication dated Nov. 2, 2015 from the Canadian Intellectual Property Office in counterpart application No. 2,864,278.
English language translation of JP 57-174203 (previously cited in the IDS filed on Aug. 15, 2014).

* cited by examiner

PNEUMATIC TIRE

CROSS REFERENCE TO RELATED APPLICATIONS

This application is a National Stage of International Application No. PCT/JP2013/001033, filed on Feb. 22, 2013, which claims priority from Japanese Patent Application No. 2012-039215, filed on Feb. 24, 2012, the contents of all of which are incorporated herein by reference in their entirety.

TECHNICAL FIELD

The present invention relates generally to a pneumatic tire and more particularly to a pneumatic tire that can be suitably used for heavy load vehicles, such as construction vehicles.

BACKGROUND ART

In pneumatic tires for heavy load vehicles, in order to preserve the traction performance of the tire, the tread surface of the tread portion situated between both tread ends is conventionally formed with lug grooves extending in the tire width direction such that at least one end of the lug groove opens in the tread end.

Pneumatic tires for heavy load vehicles are known, wherein the traction performance is preserved by forming lug grooves in the tread surface so that one end of the lug groove opens in the tread end on one side in the tire width direction and the other end terminates at a location between the both tread ends. For such tires, there has been proposed to improve the anti-cut/separation property of the tire by forming sipes that are deeper than the lug groove and thereby achieving a communication, in the tire width direction, of a lug groove that opens at the tread end on one side in the tire width direction, with a lug groove that opens at the tread end on the other side in the tire width direction (refer, for example, to Patent Document 1). Here, the term "cut/separation" refers to separation of the tread rubber that occurs along the outer peripheral surface of the belt when the widthwise center region of the tread portion (hereinafter referred to as "the tread center region") is subjected to deep injury that reaches as far as the belt.

Moreover, in the above-mentioned conventional pneumatic tires for heavy load vehicles wherein the lug groove on one side in the tire width direction is communicated by a sipe with the lug groove on the other side in the tire width direction, it is possible to suppress the shearing deformation of the tread rubber situated on the stepping-in side during the loaded rolling of the tire and thereby improve the anti-cut/separation property of the tire, by arranging sipes that are deeper than the lug groove.

PATENT DOCUMENT(S)

Patent Document 1: JP 2004-155335 A

SUMMARY OF THE INVENTION

Problem

Generally, during the loaded rolling of tires, the temperature of the tread portion rises due to the friction between the tread surface and the road surface or deformation of tread rubber. Thus, it is required for pneumatic tires to suppress the temperature rise in the tread portion and thereby suppress occurrence of failures arising from such a temperature rise.

However, in the above-mentioned tires for heavy load vehicles wherein lug grooves are formed in the tread surface, in particular the above-mentioned tires for heavy load vehicles wherein the lug grooves on one side in the tire width direction are communicated by sipes with the lug grooves on the other side in the tire width direction, since the tread center region has a small groove area, the temperature in the tread portion tends to readily rise during the loaded rolling of the tire, so that it has been difficult to sufficiently suppress occurrence of failures arising from such a temperature rise.

Therefore, it is an object of the present invention to provide a pneumatic tire adapted to effectively suppress temperature rise of a tread portion during loaded rolling of the tire, and sufficiently suppress failure of the tread portion due to the temperature rise.

Solution

In order to advantageously achieve the abovementioned object, the present invention provides a pneumatic tire comprising a tread portion that extends between both tread ends, wherein the tread portion has a tread surface formed with lug grooves, the lug grooves each extending in a tire width direction to a buttress and having an opening at least at its one end, the buttress extending from the relevant tread end radially inwards of the tire, characterized in that the buttress has a surface provided with a projection, which is situated on one side, in a tire circumferential direction, of the opening of the lug groove on a side of the buttress to protrude in the tire width direction, and the projection has a radially outer end, which is situated on a radially outer side than a radially inner end of the opening of the lug groove on the side of the buttress. In this way, by providing a projection at a predetermined location of the lug groove at its opening to the buttress and on one side in the tire circumferential direction, air is caused to flow into the lug groove and out of the lug groove during the loaded rolling of the tire. This makes it possible to promote dissipation of heat from the region formed with the lug groove, and effectively suppress temperature rise of a tread portion during loaded rolling of the tire, and sufficiently suppress failure of the tread portion due to the temperature rise.

It is noted that the term "tread end" as used herein refers to the end or edge, in the tire width direction, of the patterned region in the tread in the unloaded state of the tire applied with a prescribed inner pressure. Also, the expression "extending in the tire width direction (or tire radial direction)" is intended to describe that some element extends in the tire width direction (or tire radial direction). Here, the expression "extending in the tire width direction (or tire radial direction)" is intended encompasses a case where some element extends obliquely to a direction parallel to the tire width direction (or tire radial direction).

Incidentally, the term "applicable rim" as used herein refers to a rim that is defined by industrial standards effective for geographical regions where the tire is produced or used, such as JATMA (THE JAPAN AUTOMOBILE TYRE MANUFACTURERS ASSOCIATION, INC.) YEAR BOOK for Japan, ETRTO (EUROPEAN TYRE AND RIM TECHNICAL ORGANIZTION) STANDARD MANUAL, for European countries, TRA (THE TIRE AND RIM ASSOCIATION INC.) YEAR BOOK for the United States, etc. Further, the expression "unloaded state applied with a prescribed inner pressure" refers to an unloaded (non-loaded)

state of the tire of an applied size applied with an inner pressure (maximum air pressure) corresponding to the maximum load capacity of the tire according to the JATMA standards, etc.

In the pneumatic tire according to the present invention, it is preferred for the projection to have an outer contour as seen in the tire widthwise section, wherein the outer contour extends radially inwards and has at least one inflection point. This is because if the outer contour extends radially inwards and has at least one inflection point, then it is possible to prevent the projection from contacting the vehicle body thereby causing fracture.

Preferably, the outer contour has two or more inflection points. This is because if two or more inflection points are provided, then it is possible to suppress occurrence of bare defects upon production of tires (i.e., the defects caused by residual air between the green tire and the tire production mold), and also reduce the rubber amount used for the formation of the projection.

In the pneumatic tire according to the present invention, in its ground-contacting state wherein the tire is mounted on an applicable rim, inflated with a prescribed inner pressure and applied with a prescribed load, among the inflection points of the outer contour, the radially outermost inflection point situated on the radially outermost side of the tire is preferably located on the radially inner side of a line that passes the ground-contacting edge of the tire and extends in the tire width direction. This is because if the radially outermost inflection point is located on the radially inner side of the line that passes the ground-contacting edge of the tire and extends in the tire width direction, then it is possible to positively suppress the contact of the projection with the vehicle body in the radial direction of the tire thereby causing fracture.

Incidentally, the expression "ground-contacting state . . . applied with a prescribed load" refers to the state wherein the tire is in contact with the ground under application of the load that is 100% of the maximum load capacity as defined by the standards, such as JATMA standards.

In the pneumatic tire according to the present invention, preferably, the tread surface is formed with sipes, which are in communication with the lug groove and narrower than the lug groove. This is because the suppression effect for the temperature rise of the tread portion formed with the projection can be highly markedly achieved, given that, as compared to a pneumatic tire having a tread surface with wide grooves, the pneumatic tire having a tread surface formed with sipes more easily undergoes a temperature rise in the tread portion.

In the pneumatic tire according to the present invention, preferably, the lug groove extends obliquely to a direction parallel to the width direction of the tire; and the projection is provided on that side of the lug groove where the lug groove is more inclined than at the opening on the side of the buttress. This is because the suppression effect for the temperature rise of the tread portion formed with the projection can be highly markedly achieved, given that, the pneumatic tire having a tread surface formed with sipes for communicating the lug groove opening to the buttress on one side in the tire width direction, with the lug groove opening to the buttress on the other side in the tire width direction, more easily undergoes a temperature rise in the tread portion, as compared to a pneumatic tire having a tread surface formed with wide grooves.

In the pneumatic tire according to the present invention, preferably, the lug groove opening to the buttress on one side in the tire width direction, and the lug groove opening to the buttress on the other side in the tire width direction, are both inclined to one side in the tire circumferential direction, relative to a direction parallel to the tire width direction, and the projection is provided on that side of the lug groove where the lug groove is more inclined than at the opening on the side of the buttress. This is because if the projection is provided on the inclination side of the lug groove (that is, if that side of the opening at the buttress as seen in the tire circumferential direction, which is provided with the projection, is the side where the lug groove is inclined), then air flows into, and out of the lug groove positively, during the loaded rolling of the tire, to effectively suppress the temperature rise in the tread portion.

In the present invention, in a case where bending lug groove extends in the tire width direction, the expression "extending with inclination to a direction parallel to the tire width direction" encompasses a state as well, in which the amplitude center line of the lug groove is inclined relative to direction parallel to the tire width direction.

In the pneumatic tire according to the present invention, preferably, the lug groove opening in a buttress on one side in the tire width direction, and the lug groove opening in a buttress on the other side in the tire width direction extend obliquely, relative to a direction parallel to the width direction of the tire, toward one side in the tire circumferential direction, and the projection is provided on that side of the lug groove where the lug groove is more inclined than at the opening on the side of the buttress. This is because if the lug groove opening in a buttress on one side in the tire width direction, and the lug groove opening in a buttress on the other side in the tire width direction extend obliquely, relative to a direction parallel to the width direction of the tire, toward one side in the tire circumferential direction, and the projection is provided on that side of the lug groove where the lug groove is more inclined than at the opening on the side of the buttress, then air is caused to flow into, and out of both ends in the tire width direction during the loaded rolling of the tire, to more effectively suppress the temperature rise in the tread portion.

In the pneumatic tire according to the present invention, preferably, the tread surface is provided with a circumferential groove extending in the tire circumferential direction while intersecting the sipes in communication with the lug groove. This is because if the tread surface is provided with a circumferential groove intersecting the sipes in communication with the lug groove, then air flowed into the sipes through the lug groove is caused to further flow into the circumferential groove, or air is caused to flow out of the circumferential groove through the sipes and the lug groove, during the loaded rolling of the tire, to more effectively suppress the temperature rise in the tread portion.

In the present invention, the expression "extending in the tire circumferential direction" encompasses a case where the groove extends with inclination relative to a direction parallel to the tire circumferential direction.

In the pneumatic tire according to the present invention, preferably, the projection has a dimension in the tire width direction, which is no more than twice the dimension in the tire circumferential direction. This is because if the dimension of the projection in the tire width direction is no more than twice the dimension in the tire circumferential direction, then it is possible to prevent the projection from contacting the vehicle body or the road surface thereby causing fracture. Also, if the dimension of the projection in the tire width direction is no more than twice the dimension in the tire circumferential direction, then a sufficient amount of air is caused to flow into, and out of the lug groove during the loaded rolling of the tire, to more effectively suppress the temperature rise in the tread portion.

In the present invention, the "dimension of the projection in the tire width direction" refers to the maximum dimension of the projection as measured in the tire width direction, in an unloaded state of the tire mounted on an applicable rim and applied with a prescribed inner pressure.

In the pneumatic tire according to the present invention, preferably, a plurality of said lug grooves are provided in the tread surface on the side of at least one tread end, and each projection has a dimension in the tire width direction, which is no more than 40% of the pitch of the lug grooves. This is because if the dimension of the projection in the tire width direction is no more than 40% of the pitch of the lug grooves, then it is possible to prevent the projection from contacting the vehicle body or the road surface thereby causing fracture. Also, if the dimension of the projection in the tire width direction is no more than 40% of the pitch of the lug grooves, then a sufficient amount of air is caused to flow into, and out of the lug groove during the loaded rolling of the tire, to more effectively suppress the temperature rise in the tread portion.

In the present invention, the term "pitch of the lug groove" refers to the distance, as measured in the tire circumferential direction, between the groove width center lines of adjacent lug grooves.

In the pneumatic tire according to the present invention, preferably, the projection has a radially inner end that is situated on a radially inner side than the radially inner end of the lug groove at its opening on the side of said buttress; and the projection has a radially outer end that is spaced radially outwards from the radially inner end of said lug groove at its opening on the side of said buttress, by a distance no less than 50% of the lug groove depth. This is because if the projection extends from the radially inner end of the lug groove at the opening on the side of the buttress, radially outwards over a range of no less than 50% of the lug groove depth, then air is effectively caused to flow into, and out of the lug groove during the loaded rolling of the tire, to more effectively suppress the temperature rise in the tread portion.

In the pneumatic tire according to the present invention, preferably, a plurality of lug grooves are provided in the tread surface on the side of at least one tread end, and the projection has a dimension in the circumferential direction of the tire, which is no more than 75% of the distance between the lug grooves that are adjacent to each other with the projection therebetween. This is because if the dimension of the projection in the circumferential direction of the tire is no more than 75% of the distance between the adjacent lug grooves, then a sufficient amount of air is effectively caused to flow into, and out of the lug groove during the loaded rolling of the tire, to more effectively suppress the temperature rise in the tread portion.

In the present invention, the "dimension of the projection in the tire circumferential direction" refers to the maximum dimension of the projection as measured in the tire circumferential direction with respect to that portion of the projection, which is situated in the radially outer side than the radially inner end of the lug groove at the opening on the side of the buttress. Further, the "distance between the lug grooves" refers to the minimum distance in the tire circumferential direction between the edges of the adjacent lug grooves at the opening on the side of the buttress.

In the pneumatic tire according to the present invention, preferably, the outer surface of the buttress has a recess that is convex toward a widthwise inner side of the tire, and said projection forms the groove wall at the opening of the lug groove and on one side in the tire circumferential direction. Preferably, as seen in a widthwise section of the tire, the recess exhibits a gentle curve. This is because if such a recess is provided in the outer surface of the buttress, then air is caused to flow into, and out of the lug groove more easily during the loaded rolling of the tire, to more effectively suppress the temperature rise in the tread portion.

Technical Effect

With the pneumatic tire according to the present invention, it is possible to effectively suppress temperature rise of a tread portion during loaded rolling of the tire, and sufficiently suppress failure of the tread portion due to the temperature rise.

PREFERRED EMBODIMENTS OF THE INVENTION

Preferred embodiments of the present invention will be described below with reference to the drawings. As noted above, the present invention provides a pneumatic tire that can be advantageously used for heavy load vehicles, such as construction vehicles. The pneumatic tire according to the present invention is characterized by a projection that is provided on the surface of a buttress so that, during the rotation of the tire, air is caused to flow into, or out of the lug groove that opens to the buttress.

Figure 1:
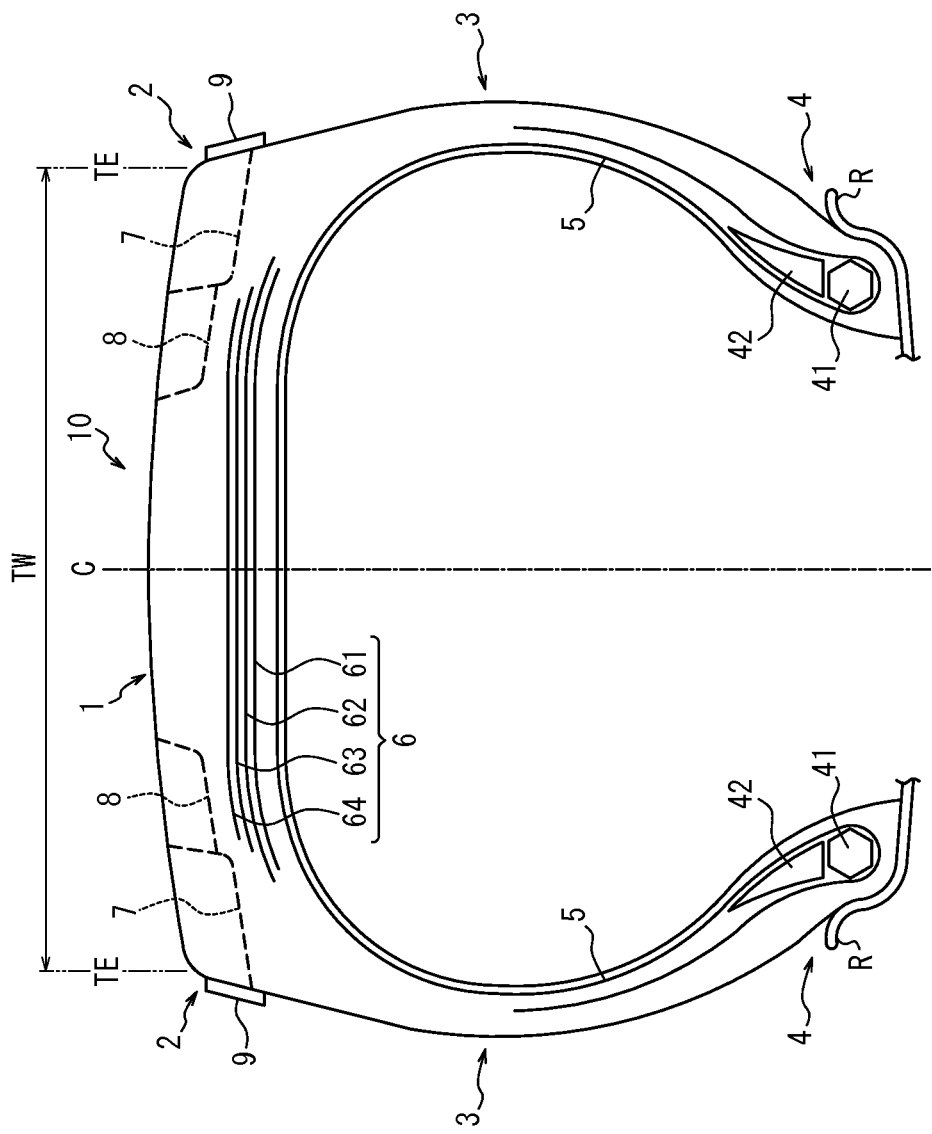
FIG. 1 is a widthwise sectional view a representative pneumatic tire according to the present invention.

FIG. 1 is a widthwise sectional view of the pneumatic tire according to the present invention, in its unloaded state, wherein the tire is mounted on an applicable rim R and applied with a prescribed inner pressure. The pneumatic tire as shown in FIG. 1 includes a tread portion 1, a pair of buttresses 2 extending from both sides (tread ends TE) of the tread portion 1 radially inwards, sidewalls 3 extending from the radially inner ends of the buttresses 2 radially inwards, and bead portions 4 contiguous to the radially inner regions of the sidewalls 3.

The pneumatic tire 10 further includes a radial carcass 5 consisting of a ply that extends between the pair of bead portions 4. In this instance, the carcass 5 comprises a carcass main body that extends toroidally over a region from the tread portion 1, through the pair of the buttresses 2 and the pair of sidewalls 3, up to the pair of bead portions 4 and is anchored to the bead cores 41 of substantially hexagonal cross-section, which are embedded in the bead portions 4, as well as turn-up portions extending from the carcass main body and turned-up around the bead cores 41 from the inner side toward the outer side in the tire width direction.

The pneumatic tire to further comprises bead fillers 42 that are arranged in the bead portions 4 on the radially outer side of the bead cores 41, so as to extend along the radial carcass 5. The bead fillers 42 are of substantially triangular cross-section so that their thickness is gradually decreased outwards in the tire radial direction. Moreover, a belt 6 is embedded in the tread portion 1 on the radially outer side of the radial carcass 5. The belt 6 is comprised of four belt layers 61, 62, 63, 64, each being made of rubber-coated cords arranged at predetermined angles to the tire circumferential direction.

It is needless to say that, in the pneumatic tire according to the present invention, the internal structure of the tire (such as the number of radial carcass plies or belt layers) is not limited to that as exemplarily shown in FIG. 1, and various changes may be made to the internal structure of the pneumatic tire according to the present invention.

Figure 3:
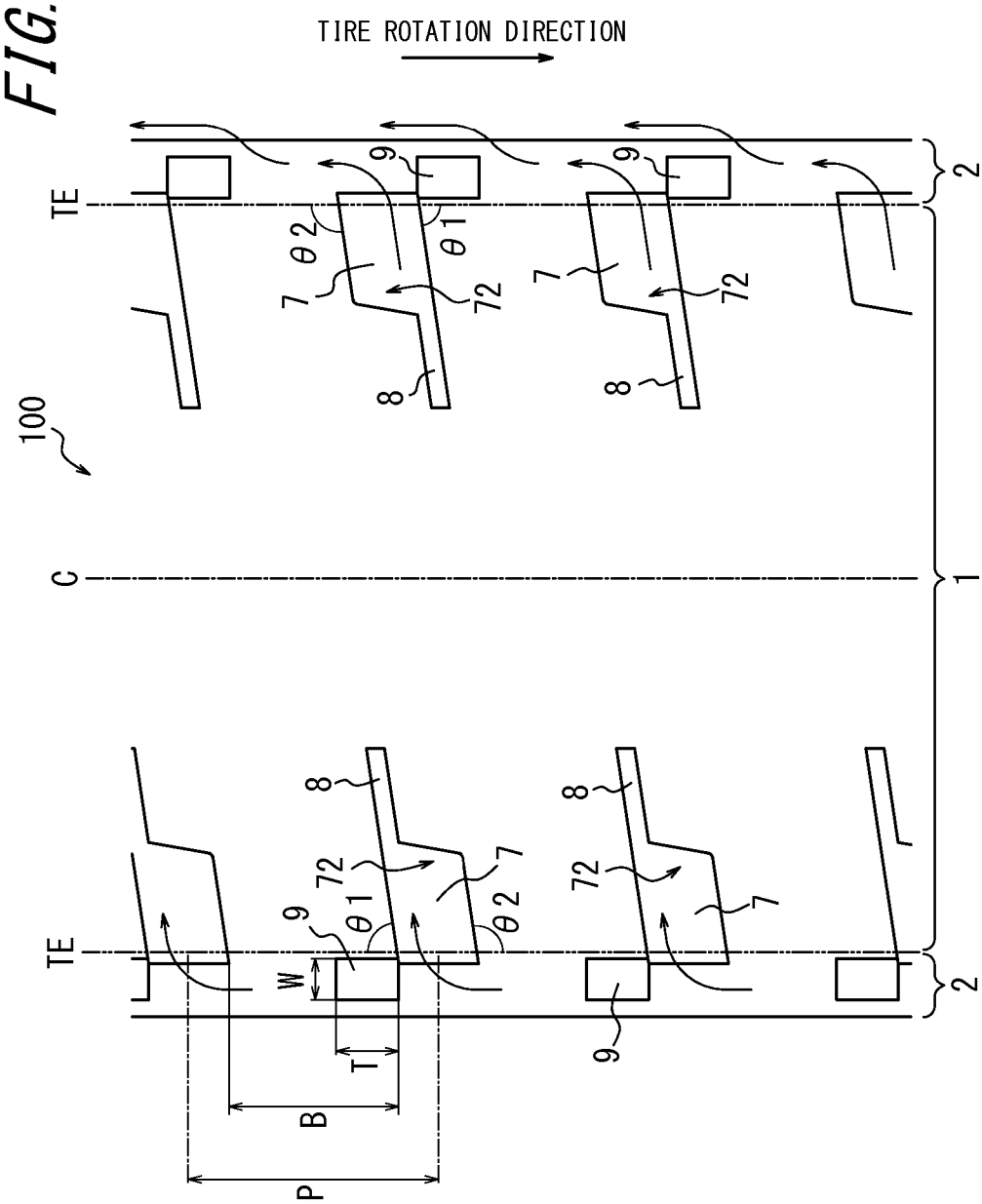
FIG. 3 is a plan view showing part of the tread portion and the buttress portion in the pneumatic tire of FIG. 1.

As shown in FIG. 3, which is the plan view of part of the tread portion 1 and the buttresses 2, the tread surface 100 of the pneumatic tire 10 located between the tread ends TE is provided, in the regions of on the sides of the tread ends TE, with a plurality of lug grooves 7. Each lug groove has one end that opens to the corresponding buttress 2. The tread surface 100 is further provided with sipes 8 that are narrower than the lug groove 7. Each sipe has one end that communicates with the lug groove 7, and another end that terminates in the tread surface 100.

Figure 2:
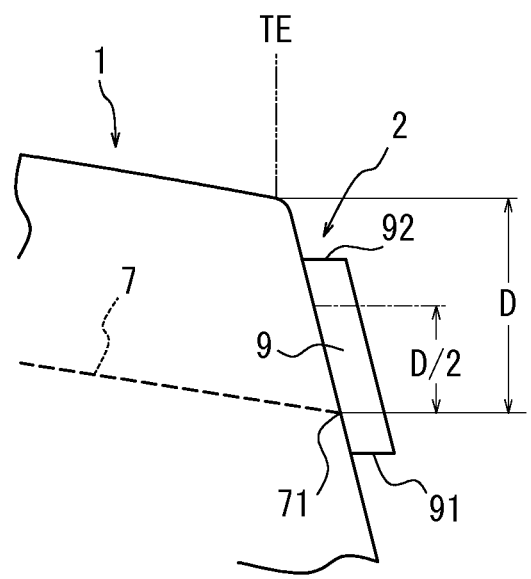
FIG. 2 is an enlarged sectional view showing the widthwise sectional shape near the buttress portion in the pneumatic tire of FIG. 1.

With reference to FIG. 2, which shows the vicinity of the buttress 2 of FIG. 1 in enlarged scale, the surface of the buttress 2 of the pneumatic tire 10, which extends from the tread end TE radially inwards, is provided with a projection 9 that protrudes in the tire width direction. As shown in FIG. 3, the projection 9 is arranged adjacent to a buttress-side opening of the lug groove 7, i.e., the opening that opens into the buttress 2, on one side of such opening as seen in the tire circumferential direction. As further shown in FIG. 2, the projection 9 has a radially outer end 92, which his located on the radially outer side than the radially inner end 71 of the buttress-side opening of the lug groove 7. That is, as seen in the widthwise section of the tire, the projection 9 extends along at least part of the buttress-side opening of the lug groove 7.

Here, as shown in FIG. 1, the groove depth of the sipe 8 is shallower than the groove depth of the lug groove 7, though this is not a prerequisite condition. As further shown in FIG. 3, the end of the lug groove 7 opposite in the tire width direction to the opening end side of the lug groove is in the form of a tapered portion 72 having a groove width that decreases gradually toward the tire equatorial plane C. The sipe 8 is in communication with the tapered portion 72 of the lug groove 7. The lug groove 7 may be formed in a region within a range of 25% of the tread width (i.e., the distance between the both tread ends TE along the tire width direction) from the tread end TE, though this is not a prerequisite condition. Further, the sipe 8 has a closed end (widthwise inner end), which may be located in a region within a range of 25% of the tread width (i.e., the distance between the both tread ends TE along the tire width direction) from the tire equatorial plane C.

As shown in FIG. 3, the lug grooves 7 and the sipes 8 extend as being inclined relative to a direction parallel to the tire width direction. More concretely, the lug groove 7, which opens to the tread end TE on one side in the tire width direction (i.e., on the left side in FIG. 3) and also to the buttress 2, extends obliquely upwards in FIG. 1 relative to the direction parallel to the tire width direction (i.e., toward right and upwards in FIG. 3). Further, the lug groove 7, which opens to the tread end TE on the other side in the tire width direction (i.e., on the right side in FIG. 3) and also to the buttress 2, extends obliquely downwards in FIG. 1 relative to the direction parallel to the tire width direction (i.e., toward left and downwards in FIG. 3)

Incidentally, the direction in which the lug groove is inclined may be defined with reference to a tire widthwise line that passes the opening of the lug groove.

With reference to FIGS. 1 to 3, the projection 9 is in the form of a cuboid, though this is not a prerequisite condition. As shown in FIG. 3, the projection 9 is arranged along the edge of, on the side in which the lug grove 7 is inclined than at the buttress-side opening of the lug groove 7. In other words, with reference to the surfaces of the buttress 2 located between the lug grooves 7 that are adjacent to each other in the tire circumferential direction, the projection is arranged adjacent to that surface on the side where the lug groove 7 forms an acute angle $\theta 1$ relative to the tire circumferential line.

In the pneumatic tire 10, since the projection 9 is arranged adjacent to the buttress-side opening of the lug groove 7 and the radially outer end 92 of the projection is arranged on the radially outer side than the radially inner end 71 of the buttress-side opening of the lug groove 7, air flows into, or out of the lug grooves 7 and the sipes 8 during the rotation of the pneumatic tire 10.

More concretely, as shown in FIG. 3, when the pneumatic tire 10 rotates downwards in FIG. 3, on the side of the tread end TE and the buttress 2 on one side in the tire width direction (i.e., on the left side in FIG. 3), the projection 9 interrupts flow of air in the vicinity of the buttress 2, thereby promoting air flow into the lug groove 7 and the sipe 8. Namely, as shown by arrows in FIG. 3, the projection 9 interrupts the air flow to generate air flow into the lug groove 7 and the sipe 8.

Furthermore, on the side of the tread end TE and the buttress 2 on the other side in the tire width direction (i.e., on the right side in FIG. 3), the projection 9 interrupts flow of air in the vicinity of the buttress 2 on the upstream side of the buttress-side opening of the lug groove 7, thereby promoting air flow out of the lug groove 7 and the sipe 8. Namely, as shown by arrows in FIG. 3, the projection 9 interrupts the air flow on the upstream side of the buttress-side opening of the lug groove 7, to form a high speed flow region of air outwards, in the tire width direction, of the buttress-side opening of the lug groove 7, thereby generate air flow into the lug groove 7 and the sipe 8.

Incidentally, when the tire rotates in the opposite direction (i.e., upwards in FIG. 3), the flow of air is reversed from what has been mentioned above.

Therefore, according to the pneumatic tire 10, even if the tread portion 1 is heated during the loaded rolling of the tire, the air flow into, and out of the lug grooves 7 and the sipes 8 is promoted, thereby promoting dissipation of heat from the regions formed with the lug grooves 7 and the sipes 8 and effectively suppressing the temperature rise in the tread portion 1. Further, since the temperature rise in the tread portion 1 is effectively suppressed, it is possible to suppress failures in the tread portion 1.

The suppression effect for the temperature rise in the tread portion as mentioned above can be particularly markedly achieved in pneumatic tires in which heat cannot be otherwise sufficiently dissipated from the grooves, such as those formed with sipes 8 in the tread surface 100. In particular, it is difficult to sufficiently dissipate heat when the width of the sipes 8 is no more than 10% of the width of the lug grooves 7. From the tire production viewpoint, it is preferred that the width of the sipes 8 is no less than 5 mm.

In the pneumatic tire 10, the end of the lug groove 7 on the side opposite, in the tire width direction, to the opening end (i.e., on the side in communication with the sipe 8) is in the form of a tapered portion 72, it is possible to reduce resistance to air flow between the lug groove 7 and the sipe 8. Therefore, the pneumatic tire 10 makes it possible to air flow into, and out of the sipe 8 through the lug groove 7.

Furthermore, in the pneumatic tire, if the lug groove 7 is formed in a region inward in the tire width direction within 25% of the tread width from the tread end TE, it is possible to simultaneously achieve facilitated air flow in the lug groove 7 and wear resistance of the tire.

In the pneumatic tire 10, since the projection 9 is arranged along the edge of the buttress-side opening of the lug groove 7, it is possible to sufficiently promote air flow into, and out of the lug groove 7 and the sipe 8. However, in the pneumatic tire 10, provided that air flow into, and out of the lug groove 7 and the sipe 8 can be sufficiently promoted, the projection 9 may be arranged at a location spaced from the edge of the buttress-side opening of the lug groove 7 in the tire circumferential direction. More concretely, the projection 9 may be spaced from the edge of the buttress-side opening of the lug groove 7 in the tire circumferential direction by a distance as measured in the tire circumferential direction from the edge of the buttress-side opening, which is no more than 30% of the distance between the adjacent lug grooves in the tire circumferential direction. However, in order that air flow into, and out of the lug grooves, etc. can be promoted, it is necessary to arrange the projection on one side, in the tire circumferential direction, of the buttress-side opening of the lug groove. If the projections are arranged adjacent to each other on both sides, in the tire circumferential direction, of the buttress-side opening of the lug groove, then the air flow in the vicinity of the buttress would be almost same as the case wherein the projections are not provided, thereby making it impossible to promote air flow into, and out of the lug grooves, etc.

Figure 4:
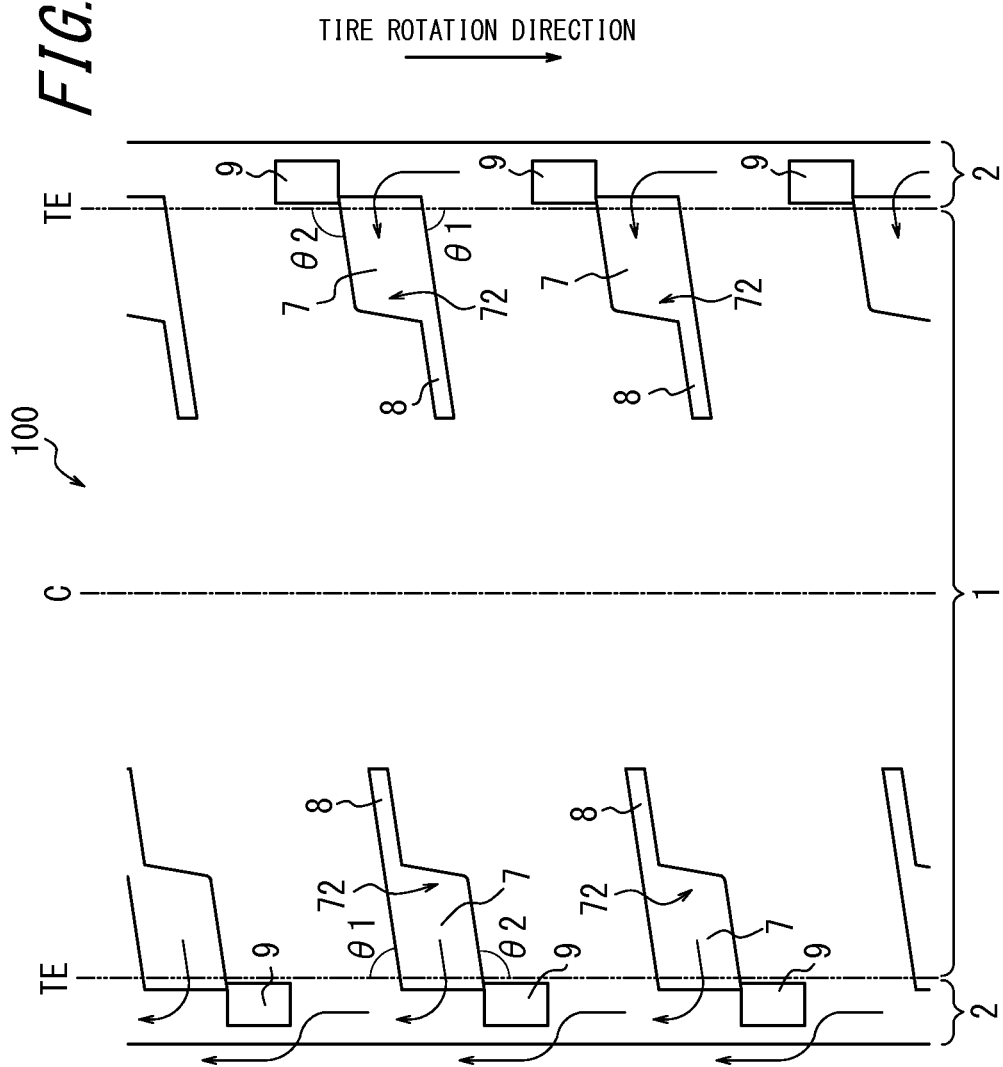
FIG. 4 is a plan view showing part of the tread portion and the buttress portion in a variant of the pneumatic tire of FIG. 3.

In the pneumatic tire 10, furthermore, the projection 9 is provided on that side of the lug groove 7 where the lug groove 9 is more inclined than at the buttress-side opening of the lug groove (i.e., the side where the lug groove forms an acute angle θ1 relative to the tire circumferential line). Thus, with reference to FIG. 4 showing part of the tread portion 1 and the buttresses in plan view, in comparison to a pneumatic tire in which the projection is provided on the side of the lug groove 7 opposite to the inclination side (i.e., the side where the lug groove forms an obtuse angle θ2 relative to the tire circumferential line), the pneumatic tire 10 makes it possible to reduce resistance to air flow as air flows into, or out of the lug grooves 7. Therefore, with the pneumatic tire 10, it is possible to further promote air flow into, or out of the sipes 8 through the lug grooves 7.

The pneumatic tire 10, of which part of the tread portion 1 and buttresses 2 is shown in FIG. 4, has a structure similar to the pneumatic tire shown in FIGS. 1 to 3, except for the location of the projection 9. In FIG. 4, same reference signs are used to denote elements similar to those of FIGS. 1 to 3.

Incidentally, in the pneumatic tire 10, when the lug grooves and the sipes extend in a direction parallel to the tire width direction, the projection may be provided for the buttress-side opening of the lug groove on either side in the tire circumferential direction.

It is referred for the projection 9 in the pneumatic tire 19 shown in FIGS. 1 to 3 to have a shape and layout to be described below.

Figure 8:
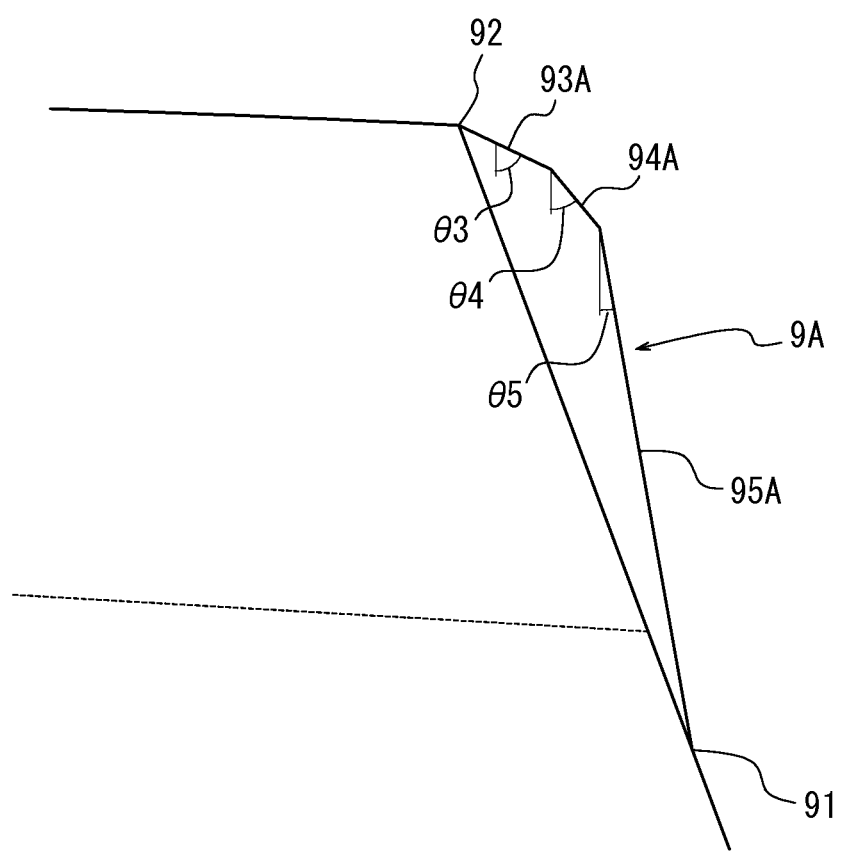
FIG. 8 is a widthwise sectional view showing the shape of a variant of the projection in enlarged scale.

Preferably, the projection 9 is of cubic shape or, alternatively, of a shape as shown in FIG. 8, of which the outer contour line as seen in the widthwise section of the tire extends radially inwards of the tire and includes one or more inflection points.

If the projection 9 is of cubic shape, rubber can readily flow into the recess of the mold corresponding to the projection, upon production of tires. It is noted that the projection may be of any shape provided that the sectional shape along the tire width direction and the sectional shape along the tire circumferential direction are rectangular.

On the other hand, if the projection is of a shape as shown in FIG. 8, of which the outer contour line as seen in the widthwise section of the tire extends radially inwards of the tire and includes one or more inflections, it is possible, during the loaded rolling of the tire, to suppress contact of the projection with the vehicle in the radial direction of the tire, thereby causing ruptures. The line defining the outer contour may be either linear or curved.

The projection 9A shown in FIG. 8 has an outer surface in the tire width direction, which is comprised of mutually distinct three planes. In other words, as seen in the widthwise section of the tire, the outer contour line of the projection 9A is comprised, from the radially outer side toward the radially inner side, of a first inclined line segment 93A corresponding to the first plane, a second inclined line segment 93B corresponding to the second plane, and a third inclined line segment 93C corresponding to the third plane. The inclined line segments form angles θ3 to θ5 to the radial direction of the tire (i.e., angles measured from the acute angle side), respectively, which are different from each other. Namely, the outer contour line of the projection 9A has two inflecting points. Further, in FIG. 8, angle θ3 is larger than angle θ4, and angle θ4 is larger than angle θ5.

With such projection 9A, since the outer contour line of the projection 9A extends from the radially outer end 92 of the projection 9A toward the radially inner side of the tire and includes one or more inflection points, when the tire is mounted to a vehicle and subjected to running, it is possible to suppress contact of the projection with the vehicle in the radial direction of the tire, thereby causing ruptures. From the viewpoint of positively preventing the projection from contact with the vehicle in the radial direction of the tire, it is preferred that, among the inflecting points of the outer contour line of the projection 9A, the outermost inflecting point on the radially outermost side is located at a position that is on the radially inner side than a line that passes the ground contacting edge and extends in the tire width direction.

Furthermore, since the outer contour line of the projection has two inflecting points, rubber can be smoothly flowed into the mold upon vulcanization of the tire so as to effectively suppress bare defects. Moreover, since two inflecting points are provided and the angles θ4 and θ5 formed by the second and third inclined line segments 94A, 94C relative to the tire radial direction are made smaller, it is possible to reduce the amount of rubber used for the formation of the projection 9A.

It is noted that, for example, the angle θ3 may be 40° to 80°, the angle θ4 may be 20° to 60°, and the angle θ5 may be 0° to 30°.

Further, as shown in FIG. 2, the radially inner end 91 of the projection 9 is preferably located on the radially inner side than the radially inner end 71 of the buttress-side opening of the lug groove 7. Moreover, the radially outer end 92 of the projection 9 is preferably located at a position that is no less than 50% of the lug groove depth D radially outwards from the radially inner end 71 of the buttress-side opening of the lug groove 7, more preferably at a 100% position (i.e., up to the tread end TE). This is because if the projection 9 is formed adjacent to the buttress-side opening of the lug groove over a long region, then it is possible for the projection 9 to sufficiently suppress air flow, thereby further promoting air flow into, or out of the lug grooves 7 etc., and effectively suppressing the temperature rise in the tread portion 1.

The dimension W of the projection 9 in the tire width direction is preferably no more than twice the dimension T of the projection 9 in the tire circumferential direction. More preferably, the dimension W of the projection 9 in the tire width direction is no less than 10% of the dimension T in the tire circumferential direction. Further, the dimension W of the projection 9 in the tire width direction is preferably no more than 40% of the pitch P of the lug grooves (i.e., the distance between the groove width centers of adjacent lug grooves in the tire circumferential direction); more preferably no more than 20% of the pitch P. It is further preferred that the dimension W of the projection 9 in the tire width direction is no less than 7.5% of the pitch P. This is because if the dimension W of the projection 9 in the tire width direction is excessive, then there is a risk that the projection comes into contact with the vehicle or road surface to cause rupture. Also, if the dimension W of the projection 9 in the tire width direction is excessive, then air tends to flow on the outer side, in the tire width direction, of the projection 9, making it difficult for the air to flow into the regions connecting the adjacent projections in the tire circumferential direction, thereby reducing the amount of air flowing into, or out of the lug grooves during the loaded rolling of the tire. On the other hand, if the dimension W of the projection 9 in the tire width direction is too small, then the amount of air flowing into, or out of the lug grooves during the loaded rolling of the tire is reduced, such that the temperature rise in the tread portion cannot be sufficiently suppressed.

Still further, the dimension T of the projection 9 in the tire circumferential direction is preferably no more than 75% of the distance B in the tire circumferential direction between the lug grooves 7, which are adjacent to each other with the projection 9 therebetween. More preferably, the dimension T of the projection 9 in the tire circumferential direction is no less than 3.7% of the distance B. This is because if the dimension T of the projection 9 in the tire circumferential direction is excessive, then the air flow in the vicinity of the buttress would be almost same as the case wherein the projections are not provided, thereby making it impossible to sufficiently promote air flow into, and out of the lug grooves 7, etc. Also, if the dimension T of the projection 9 in the tire circumferential direction is excessive, then the weight of the tire increases and the heat generation amount in the buttresses 2 (in particular, around the projection 9) increases during the loaded rolling of the tire. On the other hand, if the dimension T of the projection 9 in the tire circumferential direction is too small, then it is difficult to sufficiently preserve the strength of the projection 9.

Figure 5:
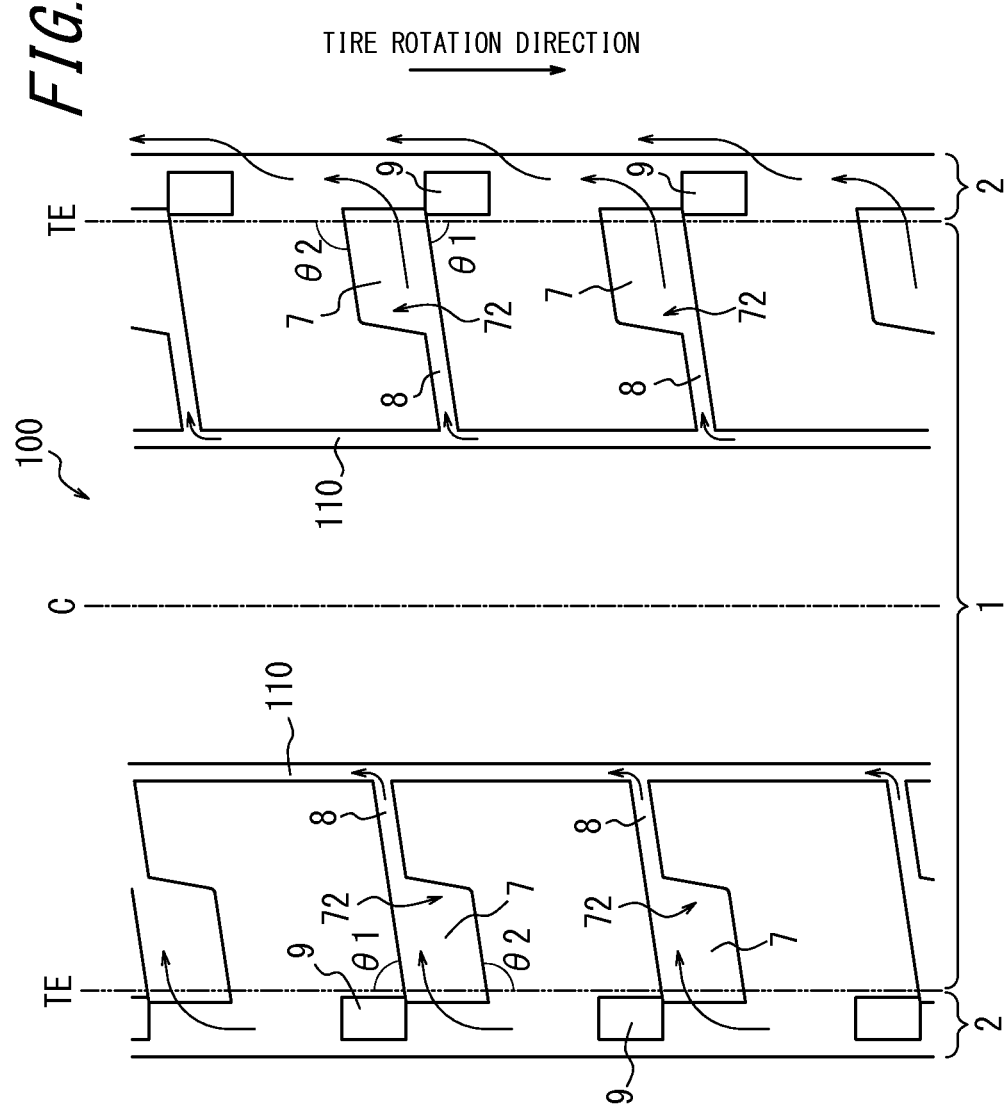
FIG. 5 is a plan view showing part of the tread portion and the buttress portion in a further variant of the pneumatic tire of FIG. 3.

In the above-mentioned pneumatic tire 10, as shown in FIG. 3, one end of the sipe 8 (on the side of the tire equatorial plane C) is in the form of a closed end. However, in the pneumatic tire according to the present invention, as shown in FIG. 5 which is the plan view of part of the tread portion 1 and the buttresses 2, the tread surface 100 may be provided with circumferential grooves 110 which extend in the tire circumferential direction while intersecting with the one end of the sipe 8 on the side of the tire equatorial plane C. If the circumferential grooves 110 intersecting with the sipes 8 are provided, then, during the loaded rolling of the tire, air flowing into the sipes 8 through the lug grooves 7 is caused to flow further into the circumferential grooves 110, or air is caused to flow out of the circumferential grooves 110 through the sipes 8 and the lug grooves 7, as shown by arrows in FIG. 5, to further effectively suppress the temperature rise in the tread portion 1. incidentally, the circumferential groove 110 is preferably in the form of a linear groove that extends along the tire circumferential direction, though it may be in the form of a groove that extends in the tire circumferential direction in a zigzag manner.

It is noted that the pneumatic tire, of which part of the tread portion 1 and buttresses 2 is shown in the plan view of FIG. 5, has a structure similar to the pneumatic tire shown in FIGS. 1 to 3, except that circumferential grooves are provided in the tread surface. In FIG. 5, the same reference signs are used to denote elements similar to those of FIGS. 1 to 3.

Although the pneumatic tire according to the present invention has been described above with reference to a specific embodiment and variations, the pneumatic tire according to the present invention is not limited to the embodiment or variations, and various changes may be suitably made to the pneumatic tire according to the present invention. More concretely, in the pneumatic tire according to the present invention, it is not necessary for all the lug grooves in the tread surface to be formed with the projections, and the projections may be arranged adjacent to some of the lug grooves only. Also, in the pneumatic tire according to the present invention, the lug groove may extend continuously between the both tread ends, with both ends opening to the buttresses.

Figure 6:
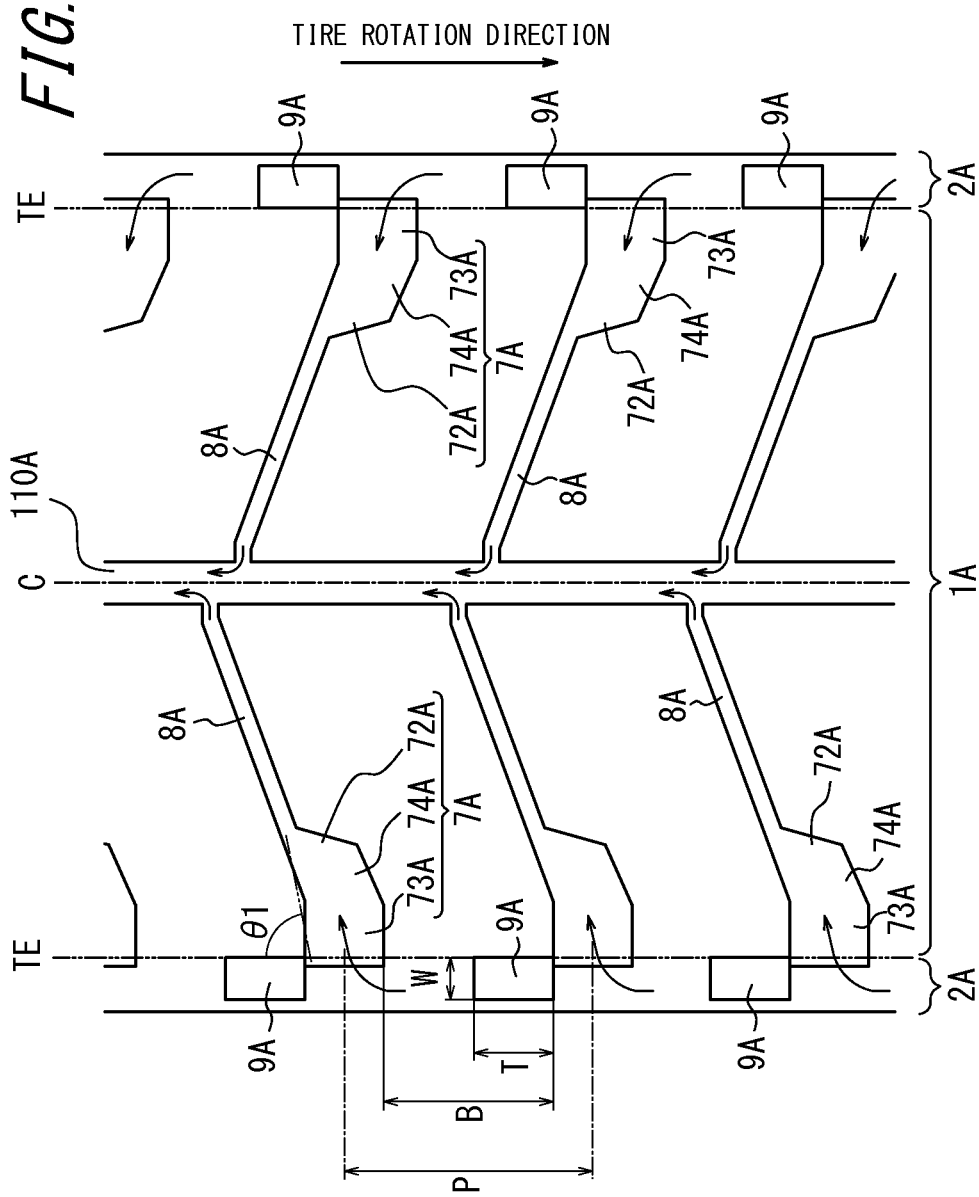
FIG. 6 is a plan view showing part of the tread portion and the buttress portion in the pneumatic tire according to another embodiment of the present invention.
Figure 7:
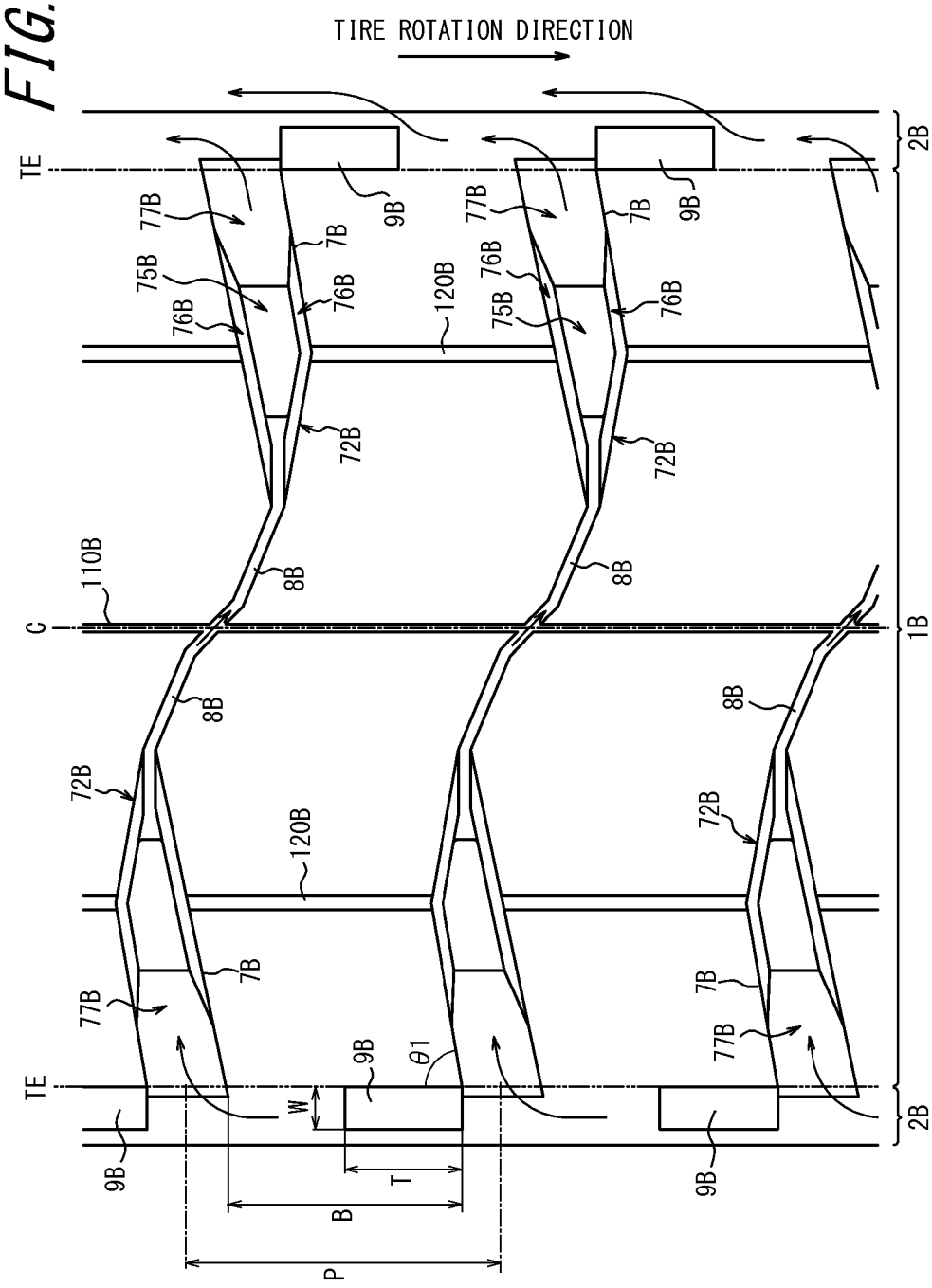
FIG. 7 is a plan view showing part of the tread portion and the buttress portion in the pneumatic tire according to still another embodiment of the present invention.
Figure 9:
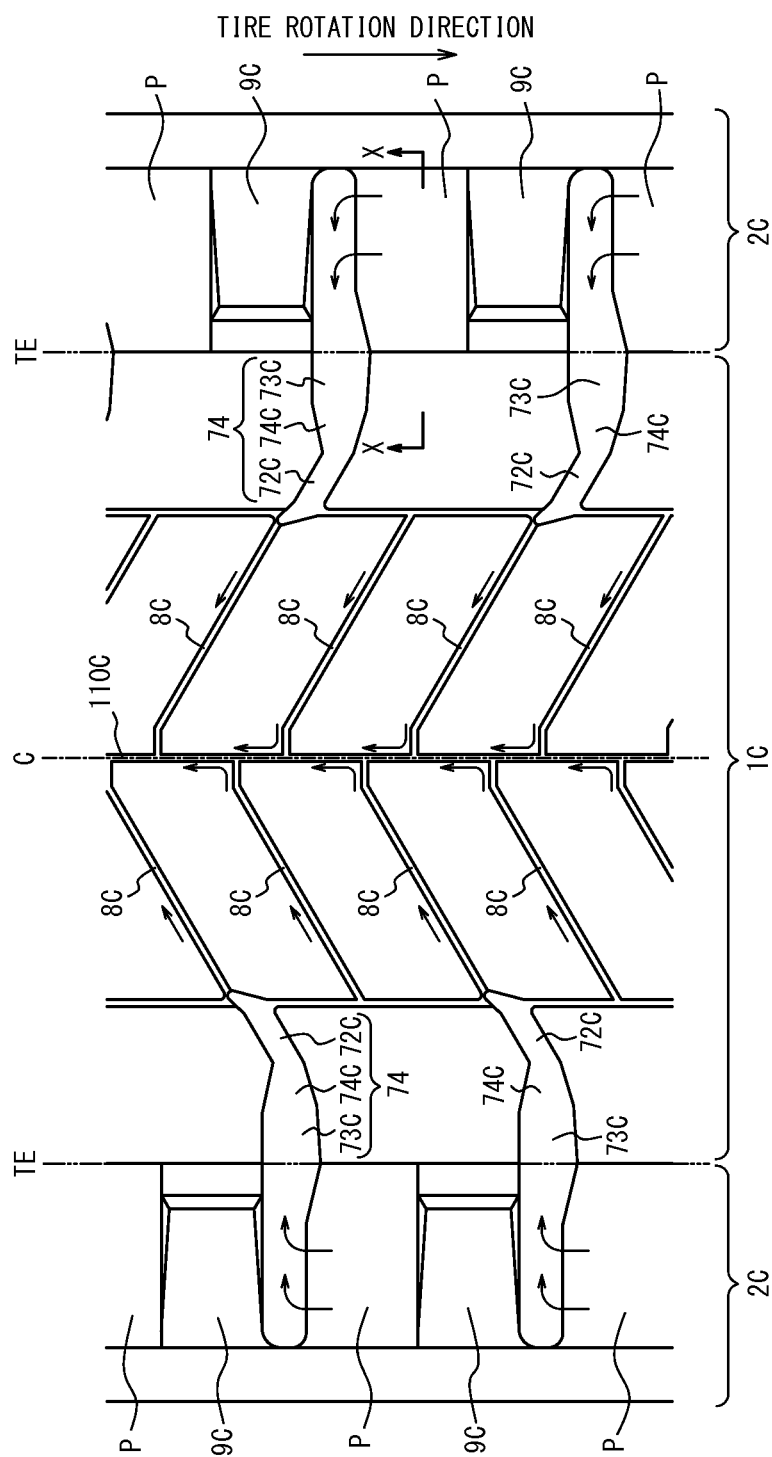
FIG. 9 is a plan view showing part of the tread portion in a pneumatic tire according to still another embodiment of the present invention, in combination with a developed view of part of the buttress portion.

Further, the pneumatic tire according to the present invention may be configured as shown in FIGS. 6, 7 and 9. It is of course that, unless otherwise noted, the pneumatic tire shown in FIGS. 6, 7 and 9 may be of a similar structure to the pneumatic tire of FIGS. 1 to 3.

The pneumatic tire, of which the plan view of part of the tread portion 1A and buttresses 2A is shown in FIG. 6, is provided, in the tread surface located between both tread ends TE, with a plurality of lug grooves 7A arranged on the sides of each tread end TE and extending in the tire width direction such that their one ends open to the buttresses 2A, sipes 8A connecting the lug grooves 7A on one side in the tire width direction, with the lug grooves 7A on the other side in the tire width direction, and a circumferential groove 110A intersecting with the sipes 8A and extending along the tire circumferential direction on the tire equatorial plane C.

The buttress 2A in the pneumatic tire shown in FIG. 6 has a surface, which is provided with projections 9A that protrude in the tire width direction. As shown in FIG. 6, each projection 9A is arranged only on one side, in the tire circumferential direction (i.e., on the upper side in FIG. 6), of the opening of the lug groove 7A to the buttress (buttress-side opening), adjacent to that opening. Further, the projection 9A extends from the radially inner end of the buttress-side opening of the lug groove 7A up to the tread end TE. Namely, the projection 9A is arranged adjacent to the buttress side opening of the lug groove 7A, from its radially inner end up to the radially outer end.

Each lug groove 7A extends in the tire width direction from the buttress-side opening while once bending toward one side in the tire circumferential direction (i.e., upwards in FIG. 6). More concretely, as seen from the buttress-side opening toward the tire equatorial plane C, the lug groove 7A is comprised of a linear section 73A that extends in parallel to the tire width direction, an inclined section 74A that extends with inclination to one side the in the tire circumferential direction relative to a direction parallel to the tire width direction, and a tapered section 72A where the grove width decreases gradually. The location of the buttress side opening of the lug groove 7A is staggered in the tire circumferential direction between one side (left side in FIG. 6) and the other side (right side in FIG. 6) in the tire width direction. Incidentally, in FIG. 6, the angle θ1 formed by the lug groove 7A relative to the tire circumferential line at the buttress-side opening of the lug groove 7A can be determined using the center line of the amplitude (bending) of the groove wall of the lug groove 7A on the upper side in FIG. 6.

The sipe 8A is narrower in width that the lug groove 7A, and communicated with the tapered section 72A of the lug groove 7A. Most part of the sipe 8A extends with inclination upwards in FIG. 6 relative to the direction parallel to the tire width direction, and the remaining part of the sipe 8A (i.e., the side intersecting with the circumferential groove 110) is comprised of parallel sections that extends in parallel along the tire width direction, and an intersecting section intersecting with the circumferential groove 110 between the parallel sections.

In the pneumatic tire shown in FIG. 6, when the pneumatic tire is rotated downwards in FIG. 6, the projection 9A interrupts the air flow in the vicinity of the buttress 2A to promote air flow into the lug groove 7A and the sipe 8A. Namely, as shown by arrows in FIG. 6, the projection 9A interrupts the air flow and thereby generates air flow into the lug groove 7A and the sipe 8A.

In the pneumatic tire shown in FIG. 6, furthermore, when the tire is rotated in the opposite direction (i.e., upwards in FIG. 6), the projection 9A interrupts the air flow in front of the buttress-side opening of the lug groove 7A to generate a high speed portion of air flow on the outer side, in the tire width direction, of the buttress-side opening of the lug groove 7A, thereby generating air flow out of the lug groove 7A and the sipe 8 toward the outer side in the tire width direction (not shown).

Therefore, according to the pneumatic tire shown in FIG. 6, as is the case with the pneumatic tire 10 of the previous embodiment, it is possible to promote air flow into, and out of the lug grooves 7A and the sipes 8A to positively suppress temperature rise in the tread portion 1A. Further, since temperature rise in the tread portion 1A can be positively suppressed, it is possible to suppress failures in the tread portion 1A. In the pneumatic tire shown in FIG. 6, since air flows inwards from both sides in the tire width direction and outwards to the outer sides in the tire width direction, the speed of air flow is particularly increased in the region of the circumferential groove 110A intersecting with the sipes 8A, to further promote the heat dissipation effect.

The pneumatic tire, of which the plan view of part of the tread portion 1B and buttresses 2B is shown in FIG. 7, is provided, in the tread surface located between both tread ends TE, with a plurality of lug grooves 7B arranged on the sides of each tread end TE and extending in the tire width direction such that their one ends open to the buttresses 2B, sipes 8B connecting the lug grooves 7B on one side in the tire width direction, with the lug grooves 7B on the other side in the tire width direction, a circumferential groove 110B intersecting with the sipes 8B and extending along the tire circumferential direction on the tire equatorial plane C, and circumferential grooves 120B communicating the lug grooves 7B that are adjacent to each other in the tire circumferential direction.

The buttress 2B in the pneumatic tire shown in FIG. 7 has a surface, which is provided with projections 9B that protrude in the tire width direction. As shown in FIG. 7, the projections 9B are arranged on one side, in the tire circumferential direction (i.e., on the side where the lug groove 7B is inclined), of the opening of the lug groove 7B to the buttress (buttress-side opening), adjacent to that opening. Further, the projection 9B extends from the radially inner end of the buttress-side opening of the lug groove 7B up to the tread end TE. Namely, the projection 9B is arranged adjacent to the buttress side opening of the lug groove 7B, from its radially inner end up to the radially outer end.

Each lug groove 7B extends from the buttress-side opening with inclination to a direction that is parallel to the tire width direction. More concretely, the lug groove 7B opening to the tread end TE and the buttress 2B on one side in the tire width direction (i.e., on the left side in FIG. 7) extends with inclination upwards, i.e., toward right and upwards in FIG. 7, relative to a direction parallel to the tire width direction. Further, the lug groove 7B opening to the tread end TE and the buttress 2B on the other side in the tire width direction (i.e., on the right side in FIG. 7) extends with inclination upwards, i.e., toward left and downwards in FIG. 7, relative to a direction parallel to the tire width direction.

As shown in FIG. 7, the end of the lug groove 7B, which is opposite in the tire width direction to the opening end, is in the form of a tapered section 72B where the groove width gradually decreases toward the tire equatorial plane C. Further, part of the groove wall of the lug groove 7B is in the form of a tapered surface 76B with a gentle inclination toward the groove bottom of the lug groove 7B. For achieving a facilitated air flow within the lug groove and the durability of the tire, the groove bottom of the lug groove 7B is comprised of a flat section 75B with a constant groove depth, and a gentle inclined surface 76B where the groove depth gradually decreases toward the buttress-side opening.

The sipe 8B is narrower than the lug groove 7B and in communication with the tapered section 72B of the lug groove 7B. Most part of the sipe 8B extends with inclination to a direction parallel to the tire width direction (i.e., toward right and downwards in FIG. 7).

The circumferential communication grooves 120B communicating adjacent lug grooves 7B in the tire circumferential direction are provided for improving the wear resistance of the tire.

In the pneumatic tire shown in FIG. 7, when the pneumatic tire is rotated downwards in FIG. 7, the projection 9B adjacent to the tread end TE and the buttress 2B on one side in the tire width direction (on the left side in FIG. 7) interrupts the air flow in the vicinity of the buttress 2B to promote air flow into the lug groove 7B and the sipe 8B. Namely, as shown by arrows in FIG. 7, the projection 9B interrupts the air flow and thereby generates air flow into the lug groove 7B and the sipe 8B. On the other hand, the projection 9B adjacent to the tread end TE and the buttress 2B on the other side in the tire width direction (on the right side in FIG. 7) interrupts the air flow in the vicinity of the buttress 2B in front of the buttress-side opening of the lug groove 7B to promote air flow out of the lug groove 7B and the sipe 8B. Namely, as shown by arrows in FIG. 7, the projection 9B interrupts the air flow in front of the buttress-side opening of the lug groove 7B, forming a high speed region of air flow on the outer side, in the tire width direction, of the buttress-side opening of the lug groove 7B and thereby generating air flow out of the lug groove 7B and the sipe 8B toward the outer side.

Thus, in this pneumatic tire, as shown by arrows in FIG. 7, the projections 9B interrupt air flow so that air flowing into the lug grooves 7B on the left side in FIG. 7 passes through the sipes 8B and flows out of the lug grooves on the right side in FIG. 7.

When the tire is rotated in the opposite direction (i.e., upwards in FIG. 7), the flow of air is reversed.

Therefore, according to the pneumatic tire shown in FIG. 7, as is the case with the pneumatic tire 10 of the previous embodiment, it is possible to promote air flow into, and out of the lug grooves 7B and the sipes 8B to promote heat dissipation from the portion formed with the lug grooves 7B and the sipes 8B and effectively suppress temperature rise in the tread portion 1B. Further, since temperature rise in the tread portion 1B can be positively suppressed, it is possible to suppress failures in the tread portion 1B. In the pneumatic tire shown in FIG. 7, since air flowing into the lug grooves 7B from one side in the tire width direction flows out quickly from the other side in the tire width direction, the heat dissipation effect is further promoted.

Another embodiment of the pneumatic tie according to the present invention is shown in FIG. 9. In FIG. 9, the buttresses 9C are shown as being developed in the plan view. This pneumatic tire has a basic structure that is same as the pneumatic tire of FIG. 6, and is provided, on the surface of the buttress 2C extending from the tread end TE radially inwards of the tire, with a recess P between the projection 9C protruding in the tire width direction and the lug groove 7C formed to open at one end to the buttress 2C, wherein the recess P is in the form of a gentle curved surface which is convex toward inside in the tire width direction.

Figure 10:
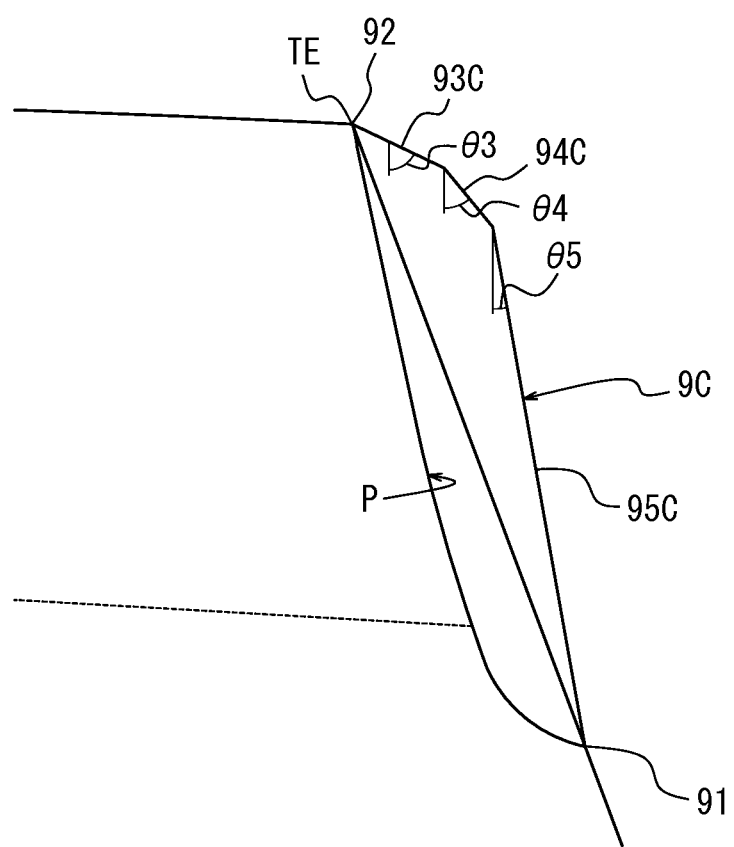
FIG. 10 is an enlarged sectional view showing the widthwise-sectional shape of the vicinity of the buttress portion in the pneumatic tire of FIG. 9.

More specifically, FIG. 10 shows the widthwise sectional view of the tire in the vicinity of the buttress 2C in enlarged scale, wherein the shallower side of the sheet surface corresponds to the recess P shown in FIG. 9, and the deeper side of the sheet surface corresponds to the projection 9C shown in FIG. 9. In this way, the recess P of the buttress is of a shape in which gentle curves are connected to each other from the tread end TE radially inwards, to remove the outer surface of the buttress 2C.

In the pneumatic tire shown in FIG. 9, when the pneumatic tire is rotated downwards in the figure, as is same with the pneumatic tires of FIGS. 3 to 7, the projection 9C interrupts the air flow in the vicinity of the buttress 2C to promote air flow into the lug groove 7C and the sipe 8C. On this occasion, by providing the recess P on the surface of the buttress 2C so as to be convex toward inside of the tire in the tire width direction, the groove wall of the lug groove 7C on the side opposite to the recess P can be used to function as the projection. Thus, the surface area of the side surface of the projection for interrupting the air flow can be increased to further effectively promote air flow into the lug grooves 7C and the sipes 8C. Namely, as shown by arrows in FIG. 9, by interrupting air flow entering into the recess P by means of the groove wall of the lug groove 7C and the projection 9C, air flow into the lug groove 7A and the sipe 8A is generated.

Therefore, according to the pneumatic tire shown in FIG. 9, as is the case with the pneumatic tires 10 of the previous embodiments, it is possible to promote air flow into, and out of the lug grooves 7C and sipes 8C and promote heat dissipation from the portion formed with the lug grooves 7C and sipes 8C, so as to positively suppress temperature rise in the tread portion 1C and suppress failures in the tread portion 1C.

In the pneumatic tire according to the present invention, if the above-mentioned recess P is formed in the surface of the buttress 2C on one side, in the tire circumferential direction, of the buttress-side opening of the lug groove, the groove wall on the opposite side across the lug groove forms a protrusion that is raised with reference to the recess P to function as the "projection" of the present invention. Namely, the "projection" of the present invention includes not only the projection on the surface of the buttress 2C to protrude in the tire width direction as shown in FIG. 2, but also a region that is relatively convex in the tire width direction, which is defined by formation of the recess P in the surface of the buttress 2C.

From the viewpoint of effectively supplying air into the lug grooves 7C, it is preferred that the recess P has a sectional shape in the tire width direction, which is concave to exhibit a gentle curve as shown in FIG. 10. It is further preferred that such sectional shape does not exhibit change along the outer circumference of the tire.

EXAMPLES

The present invention will be explained below in further details with reference to examples. It is of course that though the present invention is not limited to such examples in any sense.

Inventive Example 1

Test pneumatic tire ("Exam. 1") of the size 46/90R57 has been produced with the specification shown in Table 1 and the tread portion and buttresses as shown in FIG. 7, to evaluate the performance in the manner described below. The evaluation results are shown in Table 1.

Inventive Examples 2-6

Test pneumatic tires ("Exam. 2-7") of the size 46/90R57 have been produced, which are similar to the inventive example 1 but with modified specifications shown in Table 1, to evaluate the performance in the manner similar to the inventive example 1. The evaluation results are shown in Table 1.

Inventive Example 7

Test pneumatic tire ("Exam. 7") of the size 46/90R57 has been produced with the specification shown in Table 1 and the tread portion and buttresses as shown in FIG. 6, to evaluate the performance in the manner described below. The evaluation results are shown in Table 1.

Comparative Example 1

Comparative pneumatic tire ("Comp. 1") of the size 46/90R57 has been produced with the specification shown in Table 1 and the tread portion and buttresses similar to those of FIG. 7, except that the buttresses are not provided with the projections, to evaluate the performance in the manner similar to the inventive example 1. The evaluation results are shown in Table 1.

<Tread Temperature>

The test tires produced as above were mounted to the rim and subjected to drum running test under the conditions of air pressure of 700 kPa, load of 60 tons and speed of 8 km/h, in order to measure the average temperature of the tread portion. More concretely, plural holes were formed in the tread portion at a predetermined interval in the tire width direction, so as to reach above the belt, and thermocouples were embedded in these holes to measure the steady temperature of the tread portion during the drum test and determine the average temperature of the tread portion. The average temperature of the tread portion has been evaluated with reference to the average temperature of the tread portion in the comparative tire 1. In table 1, the tires with an average temperature, which is lower as compared to the comparative tire, are excellent in heat dissipation effect in the tread portion.

<Buttress Temperature>

The test tires produced as above were mounted to the rim and subjected to drum running test under the conditions of air pressure of 700 kPa, load of 60 tons and speed of 8 km/h, in order to measure the average temperature in the buttresses. More concretely, plural holes were formed in the buttresses, and thermocouples were embedded in these holes to measure the steady temperature of the buttresses during the drum test and determine the average temperature of the buttresses. The average temperature of the buttresses has been evaluated with reference to the average temperature of the buttresses in the comparative tire 1. In table 1, the tires with an average temperature, which is lower as compared to the comparative tire, are excellent in heat dissipation effect in the buttresses.

<Durability of the Projection>

The test tires produced as above and applied to the rim were mounted to a construction vehicle (total weight of 360 tons) under the air pressure of 700 kPa, subjected to running on unpaved road and measured the dunning distance until cracks occurred at a junction between the projection and the buttress. If no cracks occurred even after the running over 100,000 km, an evaluation of "no cracks" was given. In table 1, the longer running distance until occurrence of cracks indicates a higher durability of the projection.

It can be seen from Table 1 that, in the pneumatic tires provided with projections according to the inventive examples 1-7, the temperature rise in the tread portion can be effectively suppressed as compared to the tire of the comparative example without the projections. It can be also seen that the pneumatic tires of the inventive examples 1 and 3-6, in which the dimension of the projection in the tire width direction is within a prescribed range, are superior to the pneumatic tire of the inventive example 2 in terms of the durability of the projection. It can be further seen that the pneumatic tires of the inventive examples 1-3 and 5 and 6, in which the projection is provided on the inclination side of the lug groove, are superior to the pneumatic tire of the inventive example 4 in terms of suppression of the temperature rise of the tread portion. Still further, it can be seen that the pneumatic tires of the invention examples 1, 3 and 5, in which the location of the radially outer end of the projection is within a prescribed range, are superior to the pneumatic tire of the invention example 6 in terms of further suppression of the temperature rise of the tread portion. Yet further, it can be seen that the pneumatic tires of the inventive examples 1 and 5, in which the dimension of the projection in the tire circumferential direction is within the prescribed range, are superior to the pneumatic tire of the inventive example 3 in terms of sufficient suppression of the temperature rise of the tread portion.

Moreover, it can be seen from Table 1 that the pneumatic tire according to the inventive example 7, provided with the tread portion and the buttresses as shown in FIG. 6, is capable of satisfactorily suppressing the temperature rise of the tread portion.

INDUSTRIAL APPLICABILITY

The present invention provides a pneumatic tire adapted to effectively suppress temperature rise in the tread portion during the loaded rolling of the tire and sufficiently prevent failures of the tread portion due to the temperature rise.

REFERENCE SIGNS 1, 1A, 1B, 1C Tread portion
2, 2A, 2B, 2C Buttress

TABLE 1

| | | Comp. 1 | Exam. 1 | Exam. 2 | Exam. 3 | Exam. 4 | Exam. 5 | Exam. 6 | Exam. 7 |
|---|---|---|---|---|---|---|---|---|---|
| Shape of tread portion and buttresses | | — | FIG. 7 | FIG. 7 | FIG. 7 | — | FIG. 7 | FIG. 7 | FIG. 6 |
| Lug Grooves | Groove depth D [mm] | 65 | 65 | 65 | 65 | 65 | 65 | 65 | 65 |
| | Groove width [mm] | 70 | 70 | 70 | 70 | 70 | 70 | 70 | 80 |
| | Inclination angle θ1 [deg.] *1 | 10 | 10 | 10 | 10 | 10 | 10 | 10 | 21 |
| | Distance B of grooves [mm] | 240 | 240 | 240 | 240 | 240 | 240 | 240 | 230 |
| | Pitch P of grooves [mm] | 310 | 310 | 310 | 310 | 310 | 310 | 310 | 310 |
| Width of the sipes [mm] | | 11 | 11 | 11 | 11 | 11 | 11 | 11 | 11 |
| Projections | Widthwise dimension W [mm] | — | 60 | 150 | 60 | 60 | 60 | 60 | 60 |
| | Circumferential dimension T [mm] | — | 30 | 30 | 220 | 30 | 30 | 30 | 30 |
| | Position of the radially inner end [mm] *2 | — | −55 | −55 | −55 | −55 | +5 | −95 | −55 |
| | Position of the radially outer end [mm] *2 | — | +65 | +65 | +65 | +65 | +65 | +25 | +65 |
| | Location [—] *3 | — | Inclination side | Inclination side | Inclination side | Opposite side | Inclination side | Inclination side | Inclination side |
| W/T [—] | | — | 2.0 | 5.0 | 0.27 | 2.0 | 2.0 | 2.0 | 2.0 |
| T/B [—] | | — | 0.125 | 0.125 | 0.91 | 0.125 | 0.125 | 0.125 | 0.13 |
| T/P [—] | | — | 0.097 | 0.097 | 0.71 | 0.097 | 0.097 | 0.097 | 0.097 |
| Tread temperature [° C.] | | ±0 | −2.0 | −0.5 | −1.0 | −0.2 | −1.5 | −0.5 | −2.5 |
| Buttress temperature [° C.] | | ±0 | +0.2 | +0.2 | +1.0 | +0.2 | +0.2 | +0.2 | +0.2 |
| Projection durability [km] | | — | No cracks | 70000 | No cracks | No cracks | No cracks | No cracks | No cracks |

*1 For bending lugs, the angle formed by the width center line to the tire circumferential direction.
*2 Radially inner side relative to the radially inner end of the buttress-side opening of the lug groove is defined as negative (−), and radially outer side is defined as positive (+).
*3 The location on the lug groove inclination side relative to the buttress-side opening of the lug groove is indicated as "inclination side", and the location on the opposite side is indicated as "opposite side".

3 Sidewall
4 Bead portion
5 Radial carcass
6 Belt
7, 7A, 7B, 7C Lug groove
8, 8A, 8B, 8C Sipe
9, 9A, 9B, 9C Projection
10 Pneumatic tire
41 Bead core
42 Bead filler
61, 62, 63, 64 Belt layer
71 Radially inner end
72, 72A, 72B Tapered section
73A Linear section
74A Inclined section
75B Flat section
75B Tapered section
76 Tapered surface
77B Gentle inclined surface
91 Radially inner end
92 Radially outer end
100 Tread surface
110, 110A, 110B Circumferential groove
120B Circumferential communication groove
TE Tread end
TW Tread width
P Recess

The invention claimed is:

1. A pneumatic tire comprising a tread portion that extends between both tread ends, wherein the tread portion has a tread surface formed with lug grooves, the lug grooves each extending in a tire width direction to a buttress and having an opening at least at its one end, the buttress extending from the relevant tread end radially inwards of the tire, characterized in that:
the buttress has a surface provided with a projection, which is situated on one side, in a tire circumferential direction, of the opening of the lug groove on a side of the buttress to protrude in the tire width direction; and
the projection has a radially outer end, which is situated on a radially outer side than a radially inner end of the opening of the lug groove on the side of the buttress, wherein
said tread surface is formed with sipes, which are in communication with the lug groove and narrower than said lug groove.

2. A pneumatic tire according to claim 1, characterized in that said projection has an outer contour as seen in a tire widthwise section, said outer contour extending radially inwards and having at least one inflection point.

3. A pneumatic tire according to claim 2, characterized in that said outer contour has two or more inflection points.

4. A pneumatic tire according to claim 2, characterized in that, in a ground-contacting state of the tire wherein the tire is mounted on an applicable rim, inflated with a prescribed inner pressure and applied with a prescribed load, among said inflection points of the outer contour, a radially outermost inflection point situated on a radially outermost side of the tire is located on a radially inner side of a line that passes a ground-contacting edge of the tire and extends in the tire width direction.

5. A pneumatic tire according to claim 1, characterized in that:
said lug groove extends obliquely to a direction parallel to the width direction of the tire; and
said projection is provided on that side of the lug groove where the lug groove is more inclined than at the opening on the side of the buttress.

6. A pneumatic tire according to claim 1, characterized in that said tread surface is provided with a circumferential groove that extends in the tire circumferential direction while intersecting said sipes.

7. A pneumatic tire according to claim 1, characterized in that said projection has a dimension in the tire width direction, which is no more than twice the dimension in the tire circumferential direction.

8. A pneumatic tire according to claim 1, characterized in that
a plurality of said lug grooves are provided in the tread surface on the side of at least one tread end; and
said projection has a dimension in the tire width direction, wherein said dimension is no more than 40% of the pitch of the lug grooves.

9. A pneumatic tire according to claim 1, characterized in that:
said projection has a radially inner end that is situated on a radially inner side than the radially inner end of said lug groove at its opening on the side of said buttress; and
said projection has a radially outer end that is spaced radially outwards from the radially inner end of said lug groove at its opening on the side of said buttress, by a distance no less than 50% of the lug groove depth.

10. A pneumatic tire according to claim 1, characterized in that:
a plurality of said lug grooves are provided in the tread surface on the side of at least one tread end; and
said projection has a dimension in the circumferential direction of the tire, wherein said dimension is no more than 75% of the distance between the lug grooves that are adjacent to each other with the projection therebetween.

11. A pneumatic tire comprising a tread portion that extends between both tread ends, wherein the tread portion has a tread surface formed with lug grooves, the lug grooves each extending in a tire width direction to a buttress and having an opening at least at its one end, the buttress extending from the relevant tread end radially inwards of the tire, characterized in that:
the buttress has a surface provided with a projection, which is situated on one side, in a tire circumferential direction, of the opening of the lug groove on a side of the buttress to protrude in the tire width direction; and
the projection has a radially outer end, which is situated on a radially outer side than a radially inner end of the opening of the lug groove on the side of the buttress, wherein:
said lug grooves are formed at each tread end of the tread surface; and
said tread surface is formed with sipes, which communicate a lug groove opening in a buttress on one side in the tire width direction, with a lug groove opening in a buttress on the other side in the tire width direction, and which are narrower than said lug grooves.

12. A pneumatic tire according to claim 11, characterized in that:
the lug groove opening to the buttress on one side in the tire width direction, and the lug groove opening to the buttress on the other side in the tire width direction, are both inclined, relative to a direction parallel to the tire width direction, toward one side in the tire circumferential direction; and said projection is provided on that side of the lug groove where the lug groove is more inclined than at the opening on the side of the buttress.

13. A pneumatic tire comprising a tread portion that extends between both tread ends, wherein the tread portion has a tread surface formed with lug grooves, the lug grooves each extending in a tire width direction to a buttress and having an opening at least at its one end, the buttress extending from the relevant tread end radially inwards of the tire, characterized in that:

the buttress has a surface provided with a projection, which is situated on one side, in a tire circumferential direction, of the opening of the lug groove on a side of the buttress to protrude in the tire width direction; and the projection has a radially outer end, which is situated on a radially outer side than a radially inner end of the opening of the lug groove on the side of the buttress, wherein the outer surface of the buttress has a recess that is convex toward a widthwise inner side of the tire, and said projection forms the groove wall at the opening of the lug groove and on one side in the tire circumferential direction.

14. A pneumatic tire according to claim 13, characterized in that, as seen in a widthwise section of the tire, said recess exhibits a gentle curve.

\* \* \* \* \*